(12) United States Patent
Meredith

(10) Patent No.: US 7,587,682 B2
(45) Date of Patent: Sep. 8, 2009

(54) STRUCTURED TASK NAMING

(75) Inventor: Scott Meredith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 860 days.

(21) Appl. No.: 10/796,705

(22) Filed: Mar. 9, 2004

(65) Prior Publication Data

US 2005/0203880 A1   Sep. 15, 2005

(51) Int. Cl.
*G06F 3/00* (2006.01)
(52) U.S. Cl. .................................. 715/810; 707/3; 707/2
(58) Field of Classification Search ................. 345/810; 707/300, 200–204, 3, 4; 715/705, 810, 853, 715/530; 704/9
See application file for complete search history.

(56) References Cited

U.S. PATENT DOCUMENTS

| 5,995,921 | A | * | 11/1999 | Richards et al. ................. 704/9 |
| 7,181,438 | B1 | * | 2/2007 | Szabo ........................... 707/2 |
| 7,243,092 | B2 | * | 7/2007 | Woehler et al. ................ 707/3 |
| 2002/0023144 | A1 | * | 2/2002 | Linyard et al. .............. 709/218 |
| 2002/0078069 | A1 | | 6/2002 | Moore |
| 2003/0014428 | A1 | * | 1/2003 | Mascarenhas ............... 707/200 |
| 2003/0084096 | A1 | * | 5/2003 | Starbuck et al. ............ 709/203 |
| 2004/0019464 | A1 | * | 1/2004 | Martucci et al. ............ 702/189 |
| 2008/0154873 | A1 | * | 6/2008 | Redlich et al. .................. 707/5 |

OTHER PUBLICATIONS

Foreign office action for serial No. 05101583.2.

Anjewierden, A. & Kabel, S.; "Automatic Indexing of Documents with Ontologies," Social Science Informatics, University of Amsterdam, 2001. pp. 1-8.
Summers, K.; "Toward a Taxonomy of Logical Document Structures," Department of Computer Science, Cornell University, 1995, pp. 1-10.
E. Reiter et al.; "Automatic Generation of On-Line Documentation in the IDAS Project," Department of Artificial Intelligence, University of Edinburgh, 1992, pp. 64-71.
Rodriguez, H.; "The Domain Help System (DHS)" ISSN 1403-073X CID—Centre for User Oriented IT Design Nov. 1999, pp. 6-29.
L. Kantner et al.; "Structured Heuristic Evaluation of Online Documentation," IEEE Professional Communication Society, 2002, pp. 1-11.
Bhadra, D.; and Garg, A.; "An Interactive Visual Framework for Detecting Clusters of a Multidimensional Dataset," Department of Computer Science and Engineering 2001, pp. 1-27.
Bauer, M. "Acquisition of User Preferences for Plan Recognition," German Research Center for Artificial Intelligence, 1996, pp. 1-8.
European Search Report.

\* cited by examiner

*Primary Examiner*—William L Bashore
*Assistant Examiner*—Meseker Takele
(74) *Attorney, Agent, or Firm*—Westman, Champlin & Kelly, P.A.

(57) ABSTRACT

The concept of a specialized task identifier is disclosed to indicate the content of a file within a computer-implemented system for providing help content to a user. In one embodiment, the specialized task identifier includes at least one element selected from a controlled vocabulary. In another embodiment, the specialized task identifier is arranged in accordance with a predetermined structure of organizational elements. In yet another embodiment, the specialized task identifier is utilized as a basis to at least semi-automatically categorize within a taxonomic organization scheme.

20 Claims, 5 Drawing Sheets

STRUCTURED TASK NAMING

BACKGROUND OF THE INVENTION

The present invention generally pertains to systems and methods for organizing help content. More particularly, the present invention pertains to structured methods for creating and maintaining large sets of help topic descriptors. Even more particularly, the present invention concerns offline preparation work involved in creating and managing a set of help tasks that are eventually made available to online users. A collective set of available help tasks will be referred to herein as a "Product Task List" (PTL).

In a closed content or pre-structured help system, a user's query will generally draw a response in the form of a collection of tasks that can be selected to get task-specific help. For example, if a user inputs "I don't want other chatters to know I'm online", in return they may receive a collection of task choices such as "Hide My Online Status, "Instant Message Options", "Change My Away Message" or other more-or-less relevant tasks as determined by the query analysis system. The user then selects one of the tasks and is provided with corresponding task-specific help content.

When writers or feature designers create a new idea for a new help topic, they typically assign it a designation or title that becomes the way that writers, editors, software implementers, annotators, data collection and modeling managers, localizers, and the like understand and refer to the underlying task. Examples of task or help topic titles are "Add Printer" or "Hide My Online Status". For very small PTL's (e.g., fewer than 100 tasks), a custom title in the form of a freely constructed natural language string will typically suffice. For PTL's of more than 100 tasks, problems of scale begin to severely hamper the creation and maintenance of a PTL. For example, as the number of tasks grows, it becomes increasingly difficult to sort, view, read, and evaluate lists of new proposed tasks against an existing set. Problems of possible duplication, partial overlap, gaps, ambiguous interpretation, and the like, arise and can seriously hobble the work of editors, writers, implementers, localizers, software quality assurance and all others involved with construction of a help system.

Consider an example wherein one writer has entered a task "Improving How Well Your Computer Runs By Defragging Hard Disk" into a PTL of 3009 entries, and wherein another writer is considering the candidate task "Making Your Computer Run More Efficiently By Routinely Defragging Hard Disk". It may not be immediately apparent to the second writer that there is exists a potential for duplication under the circumstances. Applying taxonomic categories to the bare list can help to alleviate the potential duplication problem, however, consistently applying taxonomic rules can itself be problematic, due to the same descriptive confusion.

SUMMARY OF THE INVENTION

Embodiments of the present invention pertain to utilization of a specialized task identifier to indicate the content of a file within a computer-implemented system for providing help content to a user. In one embodiment, the specialized task identifier includes at least one element selected from a controlled vocabulary. In another embodiment, the specialized task identifier is arranged in accordance with a predetermined structure of organizational elements. In yet another embodiment, the specialized task identifier is utilized as a basis to at least semi-automatically categorize within a taxonomic organization scheme.

DETAILED DESCRIPTION OF ILLUSTRATIVE EMBODIMENTS

Figure 1:
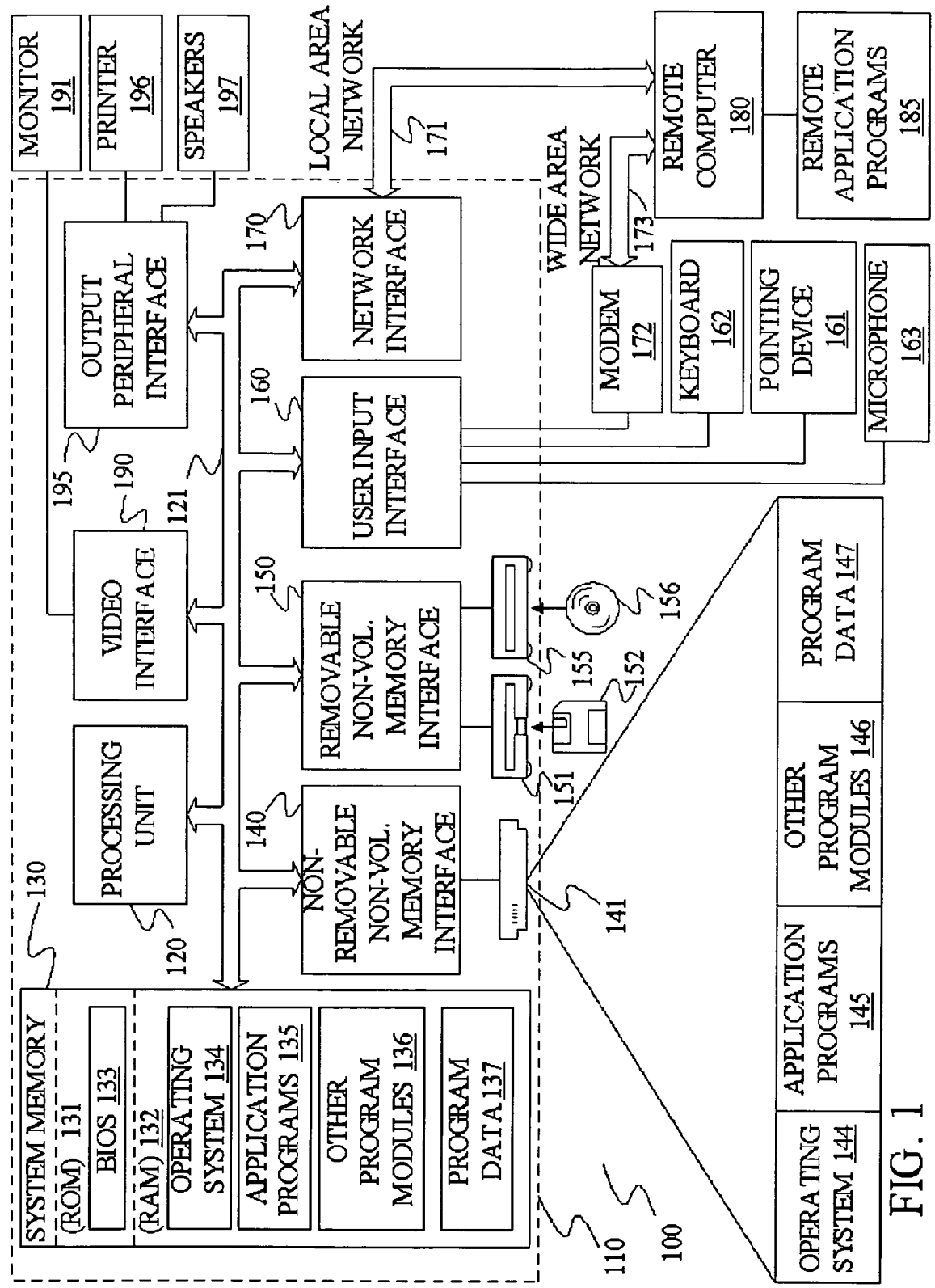
FIG. 1 is a block diagram of one computing environment in which the present invention may be practiced.

FIG. 1 illustrates an example of a suitable computing system environment 100 within which embodiments of the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Embodiments of the present invention pertain to a structured discipline for the efficient creation and reduced-overhead maintenance of large sets of help topic descriptors. More specifically, embodiments pertain to a 'Structured Task Name' ("STN") process that imposes a discipline on the naming of tasks such that they can be conveniently sorted, displayed, checked, edited, localized and the like. In accordance with one specific aspect of the present invention, a 'Task Name Grammar' is established to which task names are conformed. In one embodiment, the words or terms used to represent a grammar element are drawn from an element-specific controlled vocabulary.

While the scope of the present invention extends to the broad concept of a Task Name Grammar and is broader than any one specific grammar, for the purpose of providing a concrete example, one sample grammar will now be described. The sample grammar is illustratively well suited for, but not limited to, a Help environment associated with an operating system. The sample grammar consists of the following four elements:

Action/Object/Semantic-Relation/Secondary Object

The Action element is illustratively a common or compound verb such as "print", "find" or "learn about". The Object element is any system component that serves as the primary field of work for the Action. The Object element is illustratively drawn from a list of simple or complex/compund domain-specific entities, such as "printer", "Hard drive" or "my Documents". The Semantic-Relation element is illustratively a preposition component such as "of", "by" or "for". The Secondary Object element is illustratively another system component drawn from the same controlled list as the Object.

Implementation of the described sample grammar makes it easy to sort, view, compare, edit, refine and diagnose a list of tasks that have been identified accordingly. It should be emphasized again that the general concept of a task grammar is extendable and customizable for different applications. For example, in more complex domains, a Tertiary Object element could be added, and so on and so forth. It is within the scope of the present invention that for a given application, a customized grammar entirely different than the described sample grammar can be implemented.

Considering the above-described example pertaining to defragging a hard drive, the coding of the task illustratively conforms to the sample grammar as follows:

Defragment/Hard-Drive

The Semantic-Relation and Secondary Object elements are illustratively optional and are only utilized when necessary. It is within the scope of the present invention that one or more grammar elements be associated with a controlled vocabulary from which a user selects an appropriate descriptor. It is also within the scope to configure the system to enable a term to be added to a controlled vocabulary if necessary. It should be noted that one or more elements can be configured to be set without reliance on selection from a controlled vocabulary (e.g., a user can input any proposition for the Semantic-Relation element).

In accordance with one aspect of the present invention, Product Task Lists that are constructed in accordance with the described Structured Task Name discipline can illustratively be sorted (e.g., for editorial purposes) based on any of the element fields specified within the grammar. In accordance with one embodiment of the present invention, such sorting of raw Product Task Lists then serves as a kernel for the construction of candidate taxonomies (e.g., all Task relating with Object field "Printer" can easily be brought together). Established candidate taxonomies can then be configured to support any of a variety of system functionalities such as but not limited to new task classification and user query task identification.

Similar to the manner in which the structured programming discipline in software incorporates a restricted set of programming constructs (for/while/do-until) to restrict program logic expression and eliminate the free control mechanism of the former "GOTO" statement, thereby greatly reducing software development and maintenance costs, the Structured Task Naming concept of the present invention analogously restricts freedom of Task naming, with similar benefits. The "language" of Structured Task Naming becomes an editor's internal coding control rather than the boundaries of a natural language.

Accordingly, an individual Structured Task Name in a Product Task List serves as a kind of human readable GUID, and as such would generally not be localized itself (similar to the manner in which the C# control keywords are not usually localized in programming). In accordance with one embodiment, the final user facing Task names would not themselves be Structured Task names, but would be created based on the clear understanding of each task's intended function that the Structured Task Name provides. So, a given Product Task List would consist of a list of Structured Task Names, and each Structured Task Name would be localized into at least one user-facing Task title in as many languages as desired (e.g., English, Japanese, etc.).

It was mentioned above that taxonomies can be created based on individual element components inherent to implementations of the described Structured Task Name discipline. In accordance with one embodiment, the components of Structured Task Names also serve a specific technical function in enabling an automatic or semi-automatic creation of a taxonomy over tasks.

A taxonomy over tasks illustratively entails the creation of a multi-layered classification hierarchy. The actual Tasks are clustered at the bottom nodes of such a tree or graph. For example, a (highly over-simplified) hierarchy might have top levels "Hardware" and "Software". Then, under "Software" there might be categories such as "Operating System", "Business Applications", "Drivers", "Internet Services", and the like. Then, at the lowest layers, tasks such as "Learn About Free Email Services" would reside. Such classification systems by means of taxonomies illustratively facilitate both internal editorial work (e.g., work with an overall Product Task List) and can be configured for query searching and/or end user browsing as well.

With many tasks in a complex hierarchy, the assignment of tasks to classification bins is not trivial to accomplish and maintain. In addition, many tasks belong to more than one area of classification. For example, tasks describing an email system might reside under both Internet/email categories and also be cross-classified under software affiliated with a particular manufacturer. In another example, hardware driver tasks might exist under both Hardware and Software classifications.

In accordance with one embodiment, the Structured Task Naming of the present invention is configured to assist in the assignment of Tasks to taxonomic categories. For example, in the context of the described sample grammar, Object elements are assigned a type. Accordingly, a "printer" is illustratively categorized in three different taxonomic categories, namely, 1) Hardware, 2) Input-Output Devices, and 3) Faxes, Printers, and Scanners. Of course, the taxonomic categorization can be based on any element and not just an Object element.

Accordingly, in accordance with one aspect of the present invention, when new tasks are created, they are illustratively formed using existing Objects. The type of the task's Object then controls a preliminary assignment of the new Task to a classification node in an established taxonomy. For example, a Task "add printer" can be immediately and automatically assigned to the node "Hardware/Input-Output Devices/Faxes, Printers, and Scanners". Thus, any Task involving a printer as its Object will be so assigned, regardless of its Action or semantic relation or Secondary Object elements. Automatic multiple classification is also enabled (e.g., a single object might belong to multiple taxonomic classification types).

Figure 2:
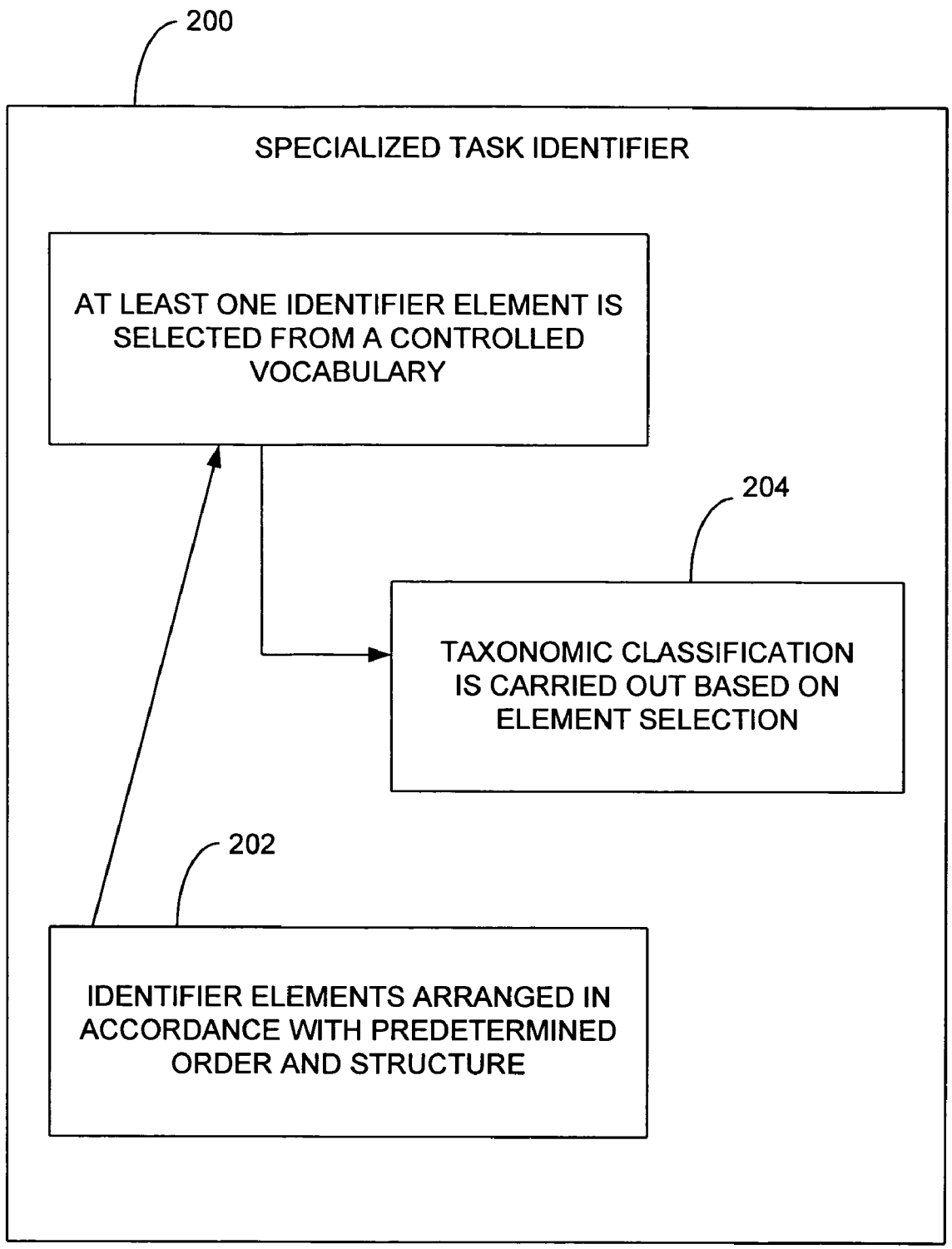
FIG. 2 is a schematic flow diagram illustrating creation of a specialized task identifier in accordance with one embodiment of the present invention.

FIG. 2 is a schematic flow diagram illustrating creation of a new specialized task identifier 200 in accordance with one aspect of the present invention. As is indicated by block 202, creation of the identifier incorporates a selection of identifier elements that arranged in accordance with a predetermined structure of organizational elements (e.g., Action+Object+Semantic-Relation+Secondary Object). In accordance with block 204, at least one of the identifier elements is selected from a controlled vocabulary. Finally, in accordance with block 206, as identifier elements are set, taxonomic classification is established based on predetermined associations between controlled vocabulary components and taxonomy-based classifiers.

Figure 3:
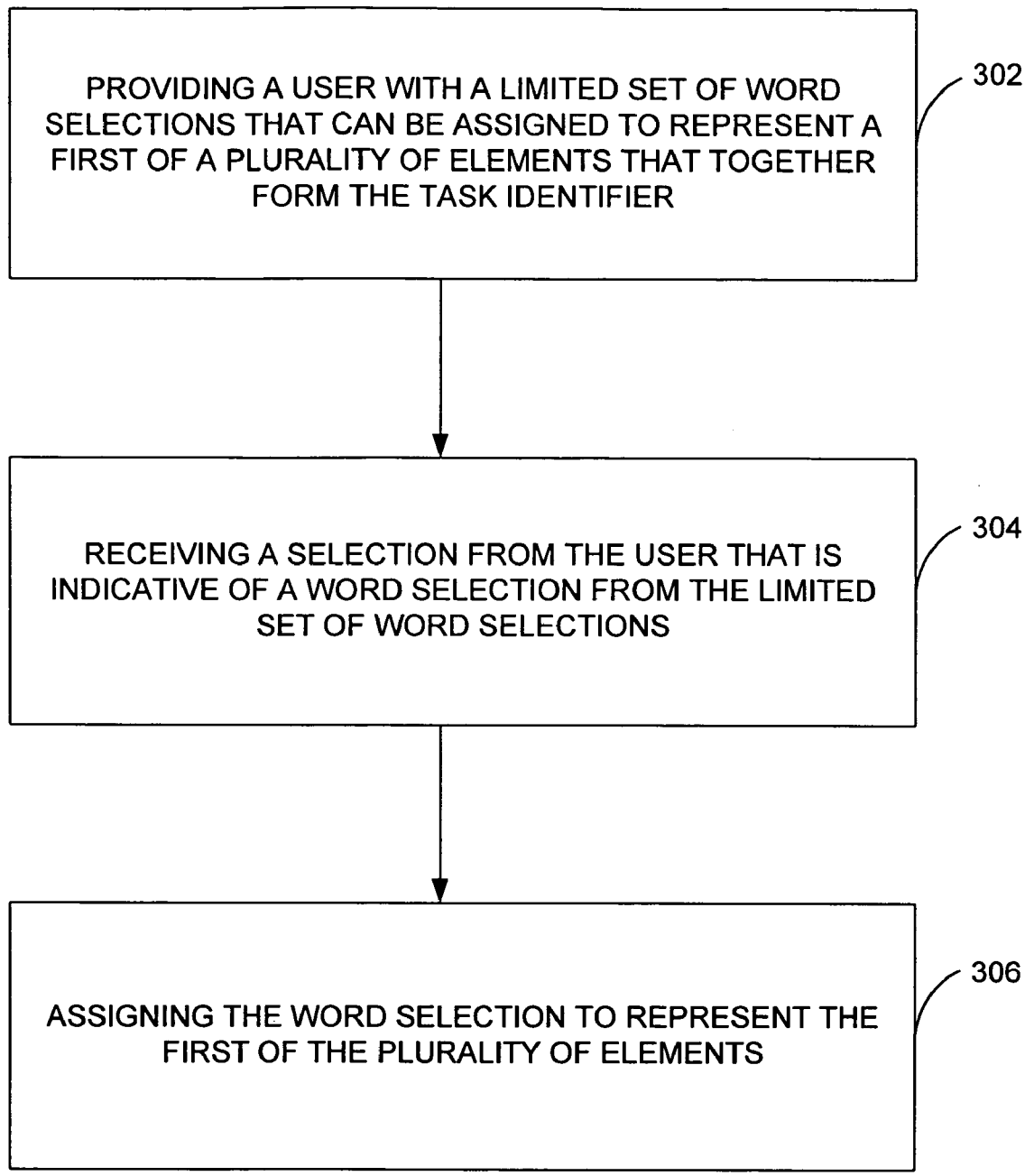
FIG. 3 is a flow chart illustrating steps associated with creating a task identifier.

FIG. 3 is a flow chart illustrating steps associated with creating a task identifier. As is indicated by block 302, a user is provided with a limited set of word selections that can be assigned to represent a first of a plurality of elements that together form the task identifier. As is indicated by block 304, the user selects a word selection from the limited set of word selections. The user's selection is illustratively based on which word selection would be an appropriate fit for the subject matter to be identified by the task identifier. Finally, as is indicated by block 306, the word selection associated with the user's selection is assigned to represent the first of the plurality of elements.

Figure 4:
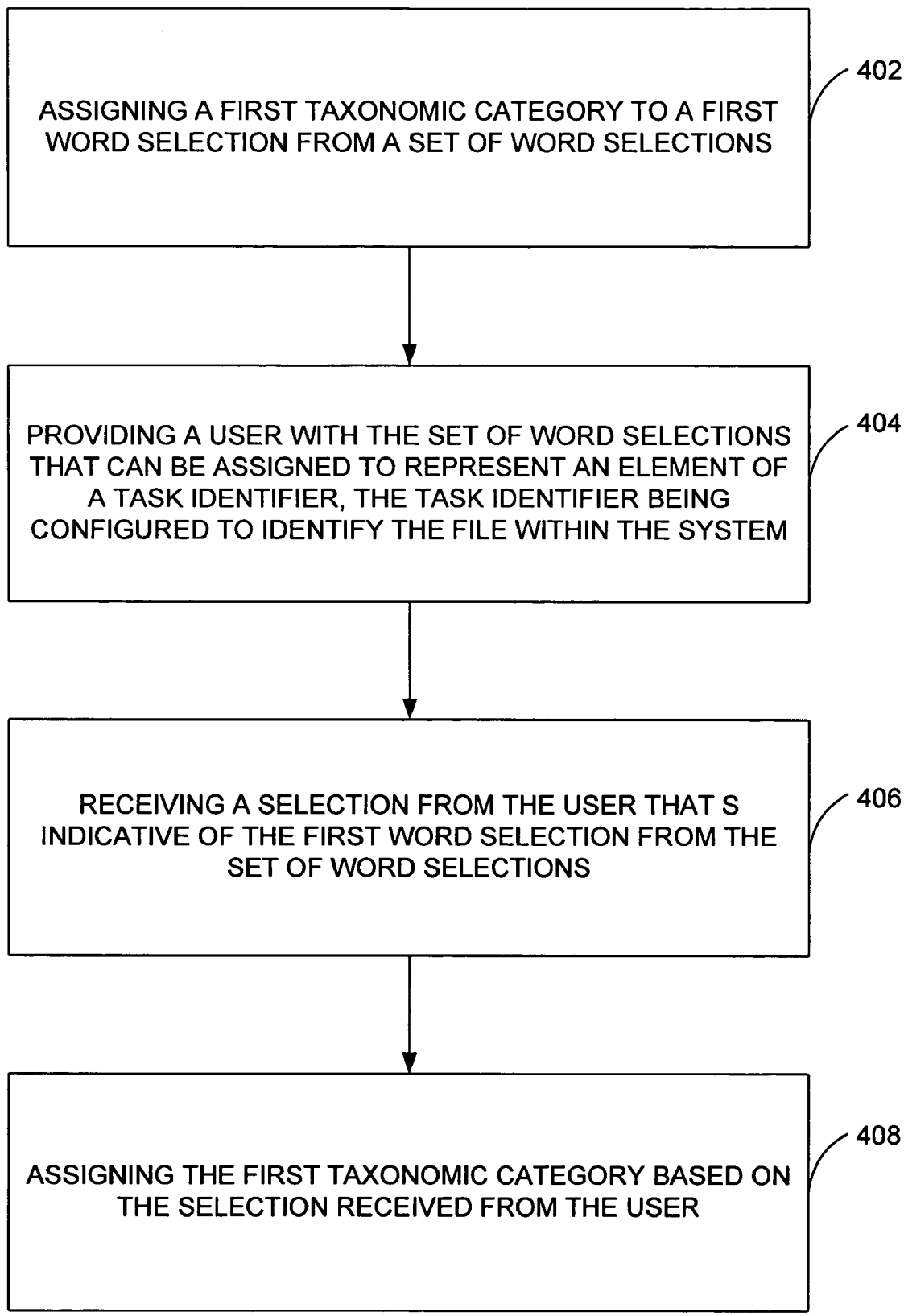
FIG. 4 is a flow chart illustrating steps associated with applying at least semi-automatically a taxonomic classification to a help file.

FIG. 4 is a flow chart illustrating steps associated with applying at least semi-automatically a taxonomic classification to a help file. As is indicated by block 402, a first taxonomic category is assigned to a first word selection from a set of word selections. In accordance with block 404, a user is provided with the set of word selections that can be assigned to represent an element of a task identifier. As is indicated by block 406, the user selects the first word selection from the set of word selections. Finally, as is indicated by block 408, the first taxonomic category is assigned based on the user's selection.

Figure 5:
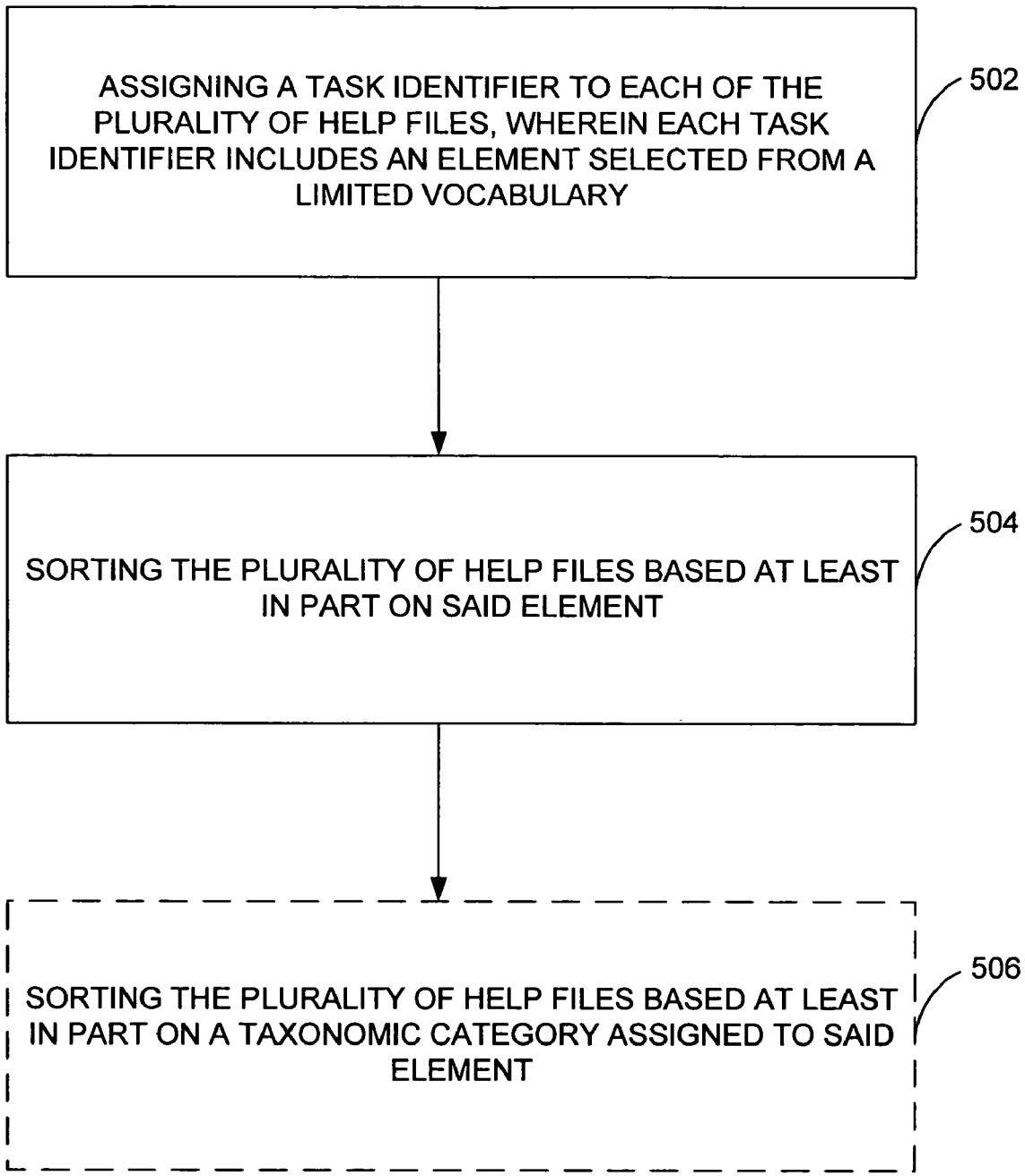
FIG. 5 is a flow chart illustrating steps associated with sorting a plurality of help files.

FIG. 5 is a flow chart illustrating steps associated with sorting a plurality of help files. As is indicated by block 502, a task identifier is assigned to each of the help files. Each task identifier illustratively includes an element selected from a limited vocabulary. In accordance with step 504, the help files can be sorted based at least in part on the element. Block 506 represents an alternative step wherein the help files can be sorted based at least in part on a taxonomic category assigned to the element.

Accordingly, embodiments of the present invention relate to methods for organizing, describing and categorizing closed-content documents. The present invention is not limited to any one application of the resulting organization structure. It can be utilized on the editorial side to reduce the likelihood that multiple documents containing substantially similar content will be included in the same Product Task List. The structure makes tasks easy to view, organize, sort, edit and manage. It enables easy identification of gaps, duplication and overlap. Applying the described concept of taxonomic classification enables still further abilities to sort, edit and manage. The structure can also be utilized to support user queries of a Product Task List. These are but a few examples within the scope of the present invention.

Embodiments that incorporate selection from a controlled vocabulary are advantageous at least because they cut down on a lot of variability wherein different terms are logical descriptors of the same concept. For example, one person might say privacy where another might choose the word security. The controlled vocabulary also conveniently supports the concept of automatic taxonomic classification. It should be emphasized that it is within the scope of the present invention to support additions to a controlled vocabulary set. In accordance with one embodiment, such additions require approval from a system administrator and/or assignment of corresponding taxonomy classifiers.

Finally, in accordance with one aspect of the present invention, with regard to assignment of a specialized task identifier, it does not matter whether the process proceeds from identifier to content or from content to identifier. In other words, in accordance with one embodiment, an author of a task file chooses an identifier before writing the corresponding task file. In accordance with another embodiment, an existing task file is reviewed and an identifier is appropriately assigned.

Although the present invention has been described with reference to particular embodiments, workers skilled in the art will recognize that changes may be made in form and detail without departing from the spirit and scope of the invention.

What is claimed is:

1. A computer-implemented method for creating and using a task identifier for indexing help file within a system for providing help content to a computer operator, the method comprising:

providing a user with a limited, closed set of word selections that can be assigned to represent one of a plurality of elements that together form the task identifier, the task identifier being indicative of a help-related task described in the content of the help file;

providing a task name grammar that designates said one of the plurality of elements as requiring an action entry in the form of a common or compound verb;

providing access to a collection of taxonomic organization data, wherein the taxonomic organization data relates each word selection in the limited, closed set to a taxonomic category, and wherein the taxonomic category for each word selection is not apparent in the word selection itself;

receiving a selection from the user that is indicative of a particular word selection from the limited, closed set of word selections;

automatically determining, based at least in part on a referral to a reference included within the taxonomic organization data, a particular taxonomic category that corresponds to the particular word selection, wherein the reference includes a record of an association that links the particular taxonomic category to the particular word selection, wherein automatically determining is a step conducted by a computer processor that is a functional component of the computer;

based on said automatic determination, automatically assigning the particular taxonomic category to the file;

automatically determining, based at least in part on the referral to the reference included within the taxonomic organization data, a second particular taxonomic category that corresponds to the particular word selection, wherein the reference further includes a record of an association that links the second particular taxonomic category to the particular word selection; and facilitating a user-initiated sorting of the file based on the particular taxonomic category, wherein the result of the sort based on the particular taxonomic category is not the same as a result of a sort based on the particular word selection.

2. The method of claim 1, further comprising:

providing the user with a second limited set of word selections that can be assigned to represent a second of the plurality of elements;

receiving a second selection from the user that is indicative of a word selection from the second limited set of word selections; and assigning said word selection from the second limited set of word selections to represent the second of the plurality of elements.

3. The method of claim 1, wherein providing a user with a limited set of word selections that can be assigned to represent a first of a plurality of elements comprises providing a user with a limited set of word selections that can be assigned to represent an object element.

4. The method of claim 1, wherein providing a user with a limited set of word selections that can be assigned to represent a first of a plurality of elements comprises providing a user with a limited set of word selections that can be assigned to represent an action element.

5. The method of claim 1, wherein the plurality of elements are arranged in accordance with a predetermined structure of organizational elements.

6. The method of claim 1, wherein the plurality of elements are arranged in accordance with a predetermined order of linguistic structural components.

7. The method of claim 1, wherein providing a task name grammar further comprises providing a task name grammar that designates a second one of the plurality of elements as requiring a semantic-relationship entry.

8. The method of claim 1, wherein the collection of taxonomic organization data is a pre-established classification hierarchy organized in multiple levels.

9. The method of claim 1, wherein receiving the selection comprises receiving a something other than a natural language input.

10. The method of claim 1, wherein the limited, closed set of word selections is a controlled vocabulary in that the selection received from the user is a selection from a list of choices.

11. A computer-implemented method for at least semi-automatically applying a taxonomic classification to a file to be incorporated into a system for providing help content to a user, the method comprising:

assigning a first taxonomic category to a first word selection from a set of word selections;

providing a user with the set of word selections that can be assigned to represent an element of a task identifier, the task identifier indicative of a help-related task described in the content of the file;

receiving a selection from the user that is indicative of a first word selection from the set of word selections, the first word selection having a meaning that is indicative of the help-related task;

determining, based on referencing a taxonomy data record indicating an association that links the first word selection to a first taxonomic category, that the firs word selection is linked by association to the first taxonomic category;

automatically assigning, based on the selection received from the user, and based on said determination that the first word selection is linked by association to the first taxonomic category, the first taxonomic category to the file;

determining, based on referencing the taxonomy data record which indicates an association that links the first word selection to the a second taxonomic category, that the first word selection is linked by association to the second taxonomic category;

automatically assigning, based on the received from the user, and based on said determination that the first word selection is lined by association to the second taxonomic category, the second taxonomic category to the file;

wherein said taxonomy data record comprises a hierarchically organized taxonomic classification structure, and wherein the first and second taxonomic categories fall within completely separate and distinct branches of the hierarchically organized taxonomic classification structure; and wherein each automatic assigning step of the computer-implemented method is a step conducted by a computer processor that is a component of the computer.

12. The method of claim 11, wherein the set of word selections is a limited, closed set of word selections thus forming a controlled vocabulary.

13. The method of claim 11, wherein the task identifier is arranged in accordance with a predetermined order of multiple linguistic structural components, the element being one of said multiple linguistic structural components.

14. The method of claim 11, farther comprising providing a task name grammar that designates said element as requiring an action entry in the form of a common or compound verb.

15. The method of claim 11, wherein receiving the selection from the user comprises receiving an input that is not a natural language input.

16. The method of claim 8, wherein said particular taxonomic category is positioned within the pre-established classification hierarchy within a different hierarchical branch than a branch within which the second particular taxonomic category is positioned.

17. The method of claim 8, wherein the limited, closed set of word selections is a controlled vocabulary in that the selection received from the user is a selection from a list of choices.

18. The method of claim 17, wherein receiving the selection comprises receiving a something other than a natural language input.

19. A computer-implemented method for applying a taxonomic classification to a file to be incorporated into a system for providing help content to a user, the method comprising:

assigning a first taxonomic category to a first word selection included in a closed set of word selections;

providing a user with the closed set of word selections, the word selections being presented as a list of candidate word selections from which an element of a task identifier can be chosen, the task identifier, when fully formed, being indicative of a help-related task described in the content of the file;

receiving a selection from the user that is indicative of a first word selection from the set of word selections, the first word selection having a meaning that is indicative of the help-related task;

assigning the first word selection as said element of the task identifier;

automatically determining, based on referencing a taxonomy data record indicating an association that links the first word selection to a first taxonomic category, that the first word selection is linked by association to the first taxonomic category;

automatically assigning, based on the selection received from the user, and based on said determination that the first word selection is linked by association to the first taxonomic category, the first taxonomic category to the file; and wherein the automatic assigning step of the computer-implemented method is a step conducted by a computer processor that is a component of the computer.

20. The method of claim 19, further comprising:
providing a task name grammar that designates said element as requiring a particular linguistic structural characteristic; and
requiring that the first word selection include said particular linguistic structural characteristic.

* * * * *